United States Patent
Massoumi et al.

(10) Patent No.: US 7,205,787 B1
(45) Date of Patent: Apr. 17, 2007

(54) ON-CHIP TERMINATION FOR A HIGH-SPEED SINGLE-ENDED INTERFACE

(75) Inventors: Ali Massoumi, Morgan Hill, CA (US); Chandrasekhara Somanathan, Milpitas, CA (US)

(73) Assignee: Neascape, Inc., Milpitas, CA (US)

( * ) Notice: Subject to any disclaimer, the term of this patent is extended or adjusted under 35 U.S.C. 154(b) by 0 days.

(21) Appl. No.: 10/997,447

(22) Filed: Nov. 24, 2004

Related U.S. Application Data

(60) Provisional application No. 60/524,522, filed on Nov. 24, 2003.

(51) Int. Cl.
*H03K 17/16* (2006.01)
(52) U.S. Cl. .......................... 326/30; 326/27
(58) Field of Classification Search ................. 326/30, 326/27, 83, 86; 327/108, 112
See application file for complete search history.

(56) References Cited

U.S. PATENT DOCUMENTS 6,307,791 B1 * 10/2001 Otsuka et al. ......... 365/189.05
6,424,169 B1 * 7/2002 Partow et al. ................ 326/30
6,573,746 B2 * 6/2003 Kim et al. ..................... 326/30

* cited by examiner

Primary Examiner—Daniel Chang
(74) Attorney, Agent, or Firm—Townsend and Townsend and Crew LLP; J. Matthew Zigmant

(57) ABSTRACT

Circuits, methods, and apparatus that provide accurate on-chip termination impedances for high-speed data interface circuits. One embodiment of the present invention provides a series termination impedance for an output driver as well as shunt termination impedances for a receive circuit. These impedances are dynamically adjusted to match a ratio of an external precision resistor. Multiple coarse and fine-grain adjustments are automatically performed by the hardware. Adjustment may occur at power up or at programmable periodic intervals, and one or both of the impedances may be updated each time an interface begins to transmit or receive data. A specific embodiment utilizes a reference resistance that is made up of a parallel combination of resistors connected through MOS transistors. This resistance is adjusted by connecting or disconnecting the parallel resistors until it matches a ratio of an external resistor. The switch settings that provide a match are then used to adjust the termination impedances at the input and output pads.

22 Claims, 12 Drawing Sheets

ON-CHIP TERMINATION FOR A HIGH-SPEED SINGLE-ENDED INTERFACE

This application claims priority from U.S. provisional application No. 60/524,522, filed Nov. 24, 2003, which is incorporated by reference.

BACKGROUND

The present invention relates to on-chip terminations for data interfaces in general, and on-chip terminations for high-speed single-ended interfaces in particular.

There are various types of signaling schemes that may be used by data interfaces that transmit and receive data. For example, data interfaces may use single-ended, differential, or other types of signaling schemes.

Differential signals require two separate signal components, each on a separate conductor, such as an integrated circuit or printed-circuit (PC) board trace. Typically, signals on each of these conductors switch in opposition to each other, for example, one signal component may transition from high to low when the other transitions from low to high. Each signal component in a differential signal pair is generated by a separate driver stage and is received by a separate receive stage.

Single-ended signals require only one signal and therefore one conductor, saving on the number of wires and their required area on a chip or PC board as compared to differential signaling. Often, single-ended signals switch in opposition to a reference voltage. This reference voltage can be shared between several single ended signals, again saving on the number of conductors. A single ended signal requires only one driver stage and one receive stage. Thus, using single ended signaling saves on the number of drivers and receives needed, and correspondingly saves power. When single-ended signals are used to transmit data from one integrated circuit to another, the reduction in the number of conductors needed means that only half the number of integrated circuit package pins are needed as compared to differential signals.

For these reasons, it is desirable to use single ended signals when transmitting data, particularly from one integrated circuit to another. But several factors can conspire to corrupt a single-ended signal and cause errors in data transmission.

These factors can be generally grouped into those that cause skew between signals and those that cause jitter on a signal. Skew between signals can be caused by mismatches in circuits that generate the signals, for example, one driver may provide more current than another driver. Skew can also result from mismatches in loading such as mismatches between trace lines, bond wires, lead frame lengths and inductances, parasitic capacitance mismatches, and the like. Jitter on a signal can be caused by signal ringing, reflections caused by termination mismatches, noise, intersymbol interference (ISI), and other phenomena.

Skew and jitter are particularly destructive in a synchronous (clocked) interface that includes several parallel data channels. For optimal data transfer, the synchronizing clock signal should be aligned to the center of each bit of data in each of the received data signals. But skew and jitter move signals in time relative to each other and to the synchronizing clock signal. This makes accurate data reception at the receiving end difficult and error prone. In high-speed interface circuits, this is more pronounced since each data bit is shorter, the same amount of skew and jitter lead to more transmission errors.

Embodiments of the invention described in co-pending U.S. patent application Ser. No. 10/997,329, filed Nov. 24, 2004, titled "High-Speed Single-Ended Interface provide circuits, methods, and apparatus that compensate for the skew factors described above. However, it is difficult to compensate for jitter since it is not static over time, rather it is variable. Thus, rather than compensating for jitter, its is desirable to reduce or eliminate it in this and similar types of interfaces. In particular, to the extent that ringing and reflections can be minimized, jitter can be reduced.

Thus, what is needed are circuit, methods, and apparatus that provide accurate on-chip termination resistances. These resistances could then be used at the transmitting and receiving ends of a high-speed single-ended interface.

SUMMARY

Accordingly, exemplary embodiments of the present invention provide circuits, methods, and apparatus for on-chip terminations in data interface circuits. While data interfaces in general benefit from incorporation of embodiments of the present invention, they are particularly suited to high-speed single-ended interfaces, an example of which are the HSTLX interfaces produced by Neascape, Inc. of San Jose, Calif.

One embodiment of the present invention provides a series termination impedance for an output driver as well as a shunt termination impedance for a receive circuit. These impedances are dynamically adjusted to match an external precision resistor, or ratio thereof. The adjustment may occur at power up, and one or both of the impedances may be updated each time an interface begins to transmit or receive data.

One embodiment of the present invention utilizes a reference resistance that is made up of a parallel combination of resistors connected through MOS transistors. This resistance is adjusted by connecting or disconnecting the parallel resistors until it matches a ratio of an external resistor. The switch settings that provide a match are then used to adjust the termination impedances at the input and output pads. Various embodiments of the present invention may incorporate one or more of these and the other features described and in the related patent applications referred to herein.

A better understanding of the nature and advantages of the present invention may be gained with reference to the following detailed description and the accompanying drawings.

DESCRIPTION OF EXEMPLARY EMBODIMENTS

Figure 1:
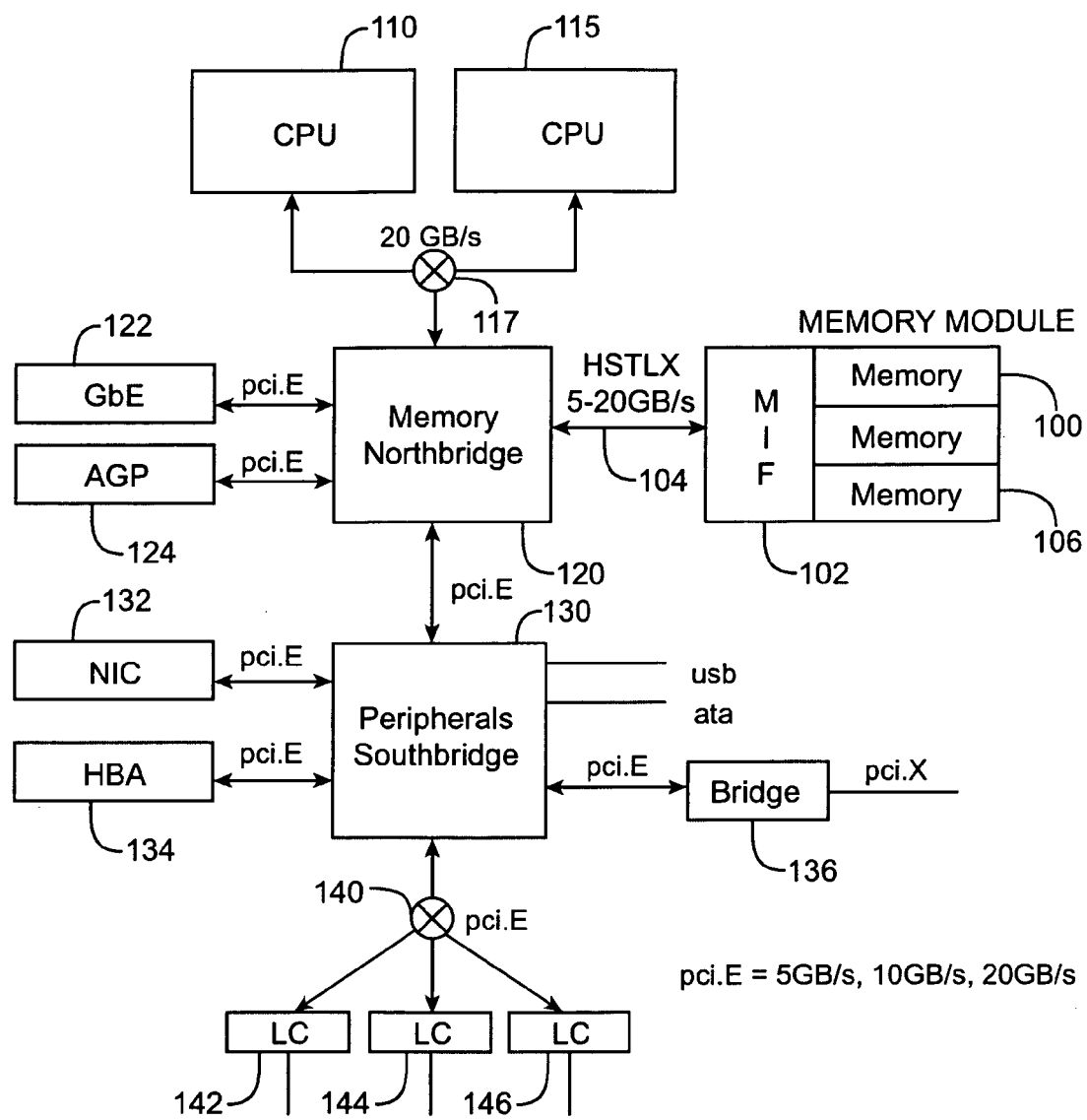
FIG. 1 is a block diagram of a computer system that incorporates one or more embodiments of the present invention.

FIG. 1 is a block diagram of a computer system that incorporates one or more embodiments of the present invention. This block diagram includes a memory module 100, CPUs 110 and 115, Memory Controller (Northbridge) 120, and Peripheral IO Controller (Southbridge) 130. The Northbridge 120 is connected to the system memory, the memory module 100 via a high speed HSTLX interface. The Northbridge 120 is further connected to a Gigabit Ethernet (GbE) network 122 and an Advanced Graphics Port (AGP) bus 124. The Southbridge 130 is further connected to a network interface card (NIC) 132, host bus adapter (HBA) 134, PCI bridge 136, and PCI multiplexer or hub 140, which is further connected to line cards 142, 144, and 146. This figure, as with the other included figures, is included for exemplary purposes only and does not limit either the embodiments of the present invention or the claims. For example, in the following figures, specific numbers of inputs, phase-shifted clock signals, and the like are given as examples. In other embodiments of the present invention, different numbers of these may be included.

A specific embodiment of the present invention particularly benefits data transfers to and from the system memory. This embodiment provides termination resistors for a high-speed source-synchronous parallel interface between the Northbridge 120 and the system memory, in this case the memory module 100. This interface may be referred to as a high-speed single-ended (HSSE) connection or interface. Alternately, since this connection is an improvement on an HSTL compliant connection, it may be referred to as an HSTLX connection or interface.

Other embodiments of the present invention may be used to provide termination resistances for connections between devices in this computer system. For example, the interface between the CPUs 110 and 115 and the Northbridge 120 may be improved by embodiments of the present invention. Also, embodiments of the present invention may be used to improve the interface between different portions of circuitry in the same device. For example, the interface between two portions of the Northbridge 120 or CPUs 110 and 115 may connected to each other using embodiment of the present invention.

Figure 2A:
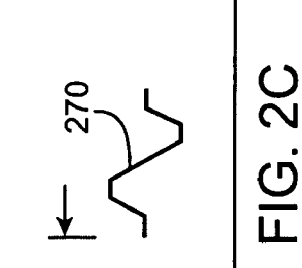
FIG. 2A is an exemplary waveform provided by a high-speed single-ended transmitter.

FIG. 2A is an exemplary waveform provided by a high-speed single-ended transmitter. This transmitter may be located, for example, on Northbridge 150, memory module 100, or other circuit. The waveform 200 is transmitted with a robust amplitude and desirable rise and fall times. In fact, various embodiments provide controlled rise and fall times to reduce ringing and reflection. Also, pre-emphasis may be provided for applications with relatively long chip-to-chip interconnect where filtering by the load described below becomes excessive.

Figure 2B:
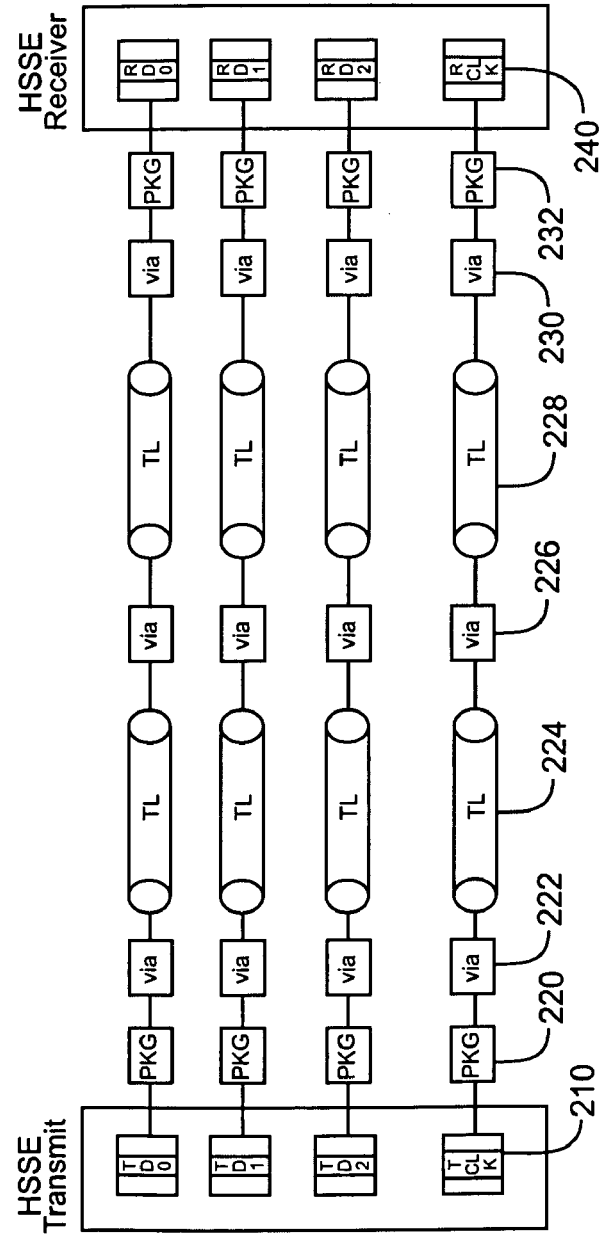
FIG. 2B illustrates the signal path components that cause skew between single-ended signals and degradation of a single ended signal.
Figure 2C:
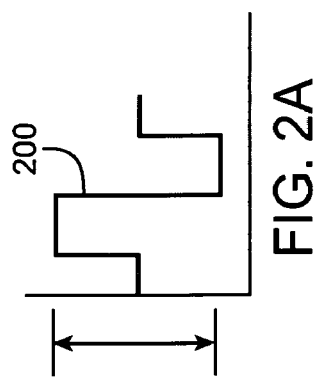
FIG. 2C is an exemplary waveform received by a high-speed single-ended receiver.

FIG. 2B illustrates the signal path components that cause skew between single-ended signals and degradation of a single-ended signal. The signal path for each pin includes the transmitter 210, package 220—which possibly includes bond wires, package lead-frame, and pad and ESD protection—via 222, trace lengths 224 and 228 broken up by via 226, via 230, receiver package 232, and receiver circuitry 240. The stray capacitances and series inductances and resistances in this path degrade the rising and falling edges of the transmitted signal and act as a filter that attenuates its amplitude. FIG. 2C is an exemplary waveform received by a high-speed single-ended receiver. To the extent that accurate on-chip terminations are used, the ringing and reflection caused by impedance mismatches can be reduced.

Figure 3A:
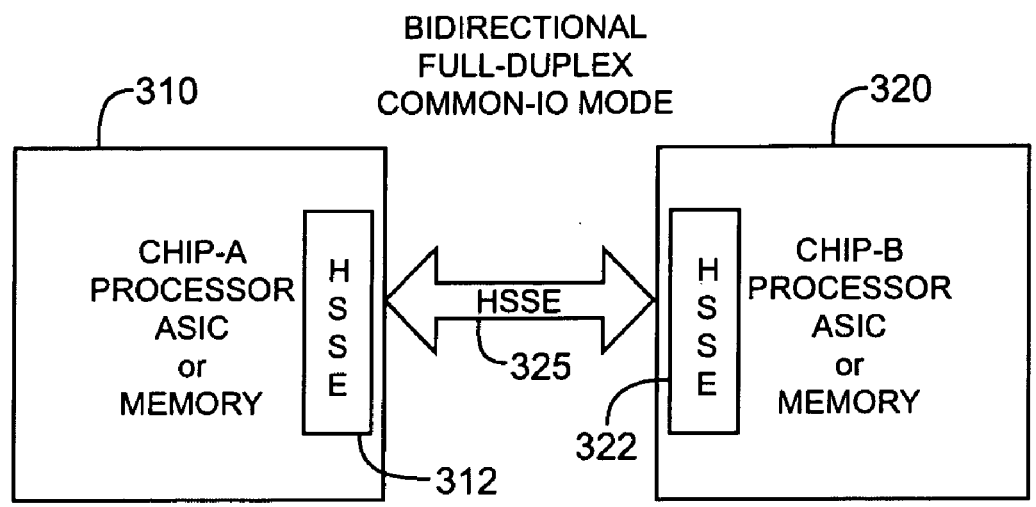
FIG. 3A illustrates a first integrated circuit communicating with a second integrated circuit over a high-speed single-ended bidirectional interface and FIG. 3B illustrates a first integrated circuit and a second integrated circuits communicating with each other over high-speed single-ended unidirectional interfaces.

FIG. 3A illustrates an embodiment of the present invention where a first integrated circuit communicates with a second integrated circuit over a high-speed single-ended bidirectional interface. The first integrated circuit 310 and the second integrated circuit 320 may be a processor, ASIC, memory, or other type of device. The first integrated circuit 310 includes a first high-speed single-ended interface 312, while the second integrated circuit 320 includes a second high-speed single-ended interface 322. The first and second integrated circuits communicate with each other in a bidirectional or full duplex mode over high-speed single-ended bidirectional bus 325 via their high-speed single-ended interfaces 312 and 322. The HSSE interfaces in this and the other figures may alternately be referred to as HSTLX interfaces.

Figure 3B:
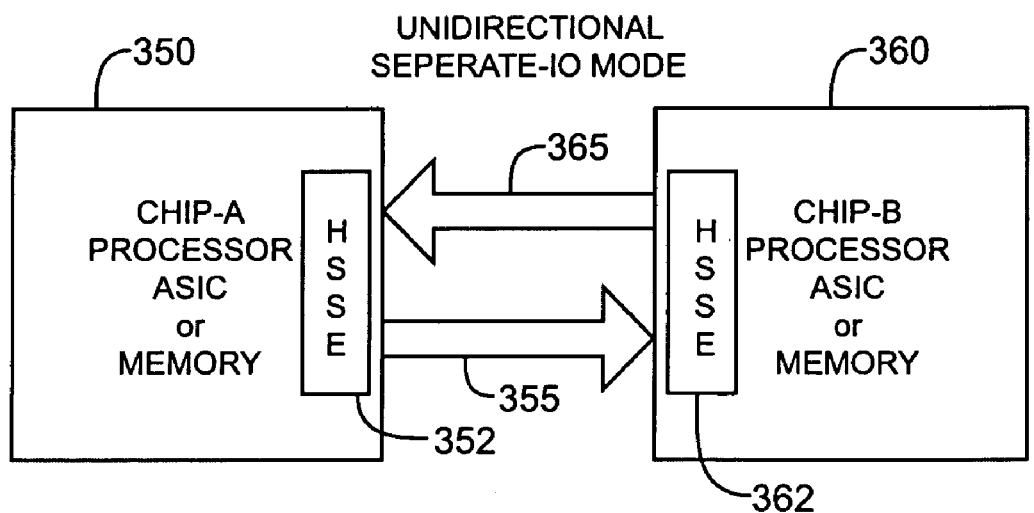

FIG. 3B illustrates an embodiment of the present invention where a first integrated circuit 350 and a second integrated circuit 360 communicates with each other over high-speed single-ended unidirectional interfaces 355 and 365. The first integrated circuit 350 and the second integrated circuit 360 may be a processor, ASIC, memory, or other type of device. The first integrated circuit 350 includes a high-speed single-ended interface 352, while the second integrated circuit 360 includes a high-speed single-ended interface 362. The first integrated circuit and the second integrated circuits communicate with each other via the high-speed single-ended interfaces 352 and 262 using unidirectional buses 355 and 365. Specifically, integrated circuit 350 sends data to integrated circuit 360 using bus 355, while integrated circuit 360 sends data to the first integrated circuit 350 using high-speed single-ended bus 365.

Single-ended signals are signals that are carried on a single line or wire. Typically, they have a DC component or offset around which a signal such as an AC voltage component varies. They may alternately be considered as changing or transitioning between two or more levels, for example, logic signals transition between two logic levels. However, after passing from one chip to another, for example over a printed-circuit board trace as shown in FIG. 2B, such a logic signal may become rounded, and may exhibit ringing characteristics or other artifacts, particularly at high data transfer rates. Accordingly, proper data detection and recovery at the receiving end may become difficult.

Thus it is desirable to have accurate termination impedance at both the transmitting and receiving ends of a data interface. Accurate terminations reduce reflections caused by termination mismatches. Further, to the extent that the terminations are on-chip (that is, formed on the same integrated circuit die substrate as the interface input and output circuitry), external resistors are not needed, saving on printed circuit board space, insertion costs, and component count.

Figure 4:
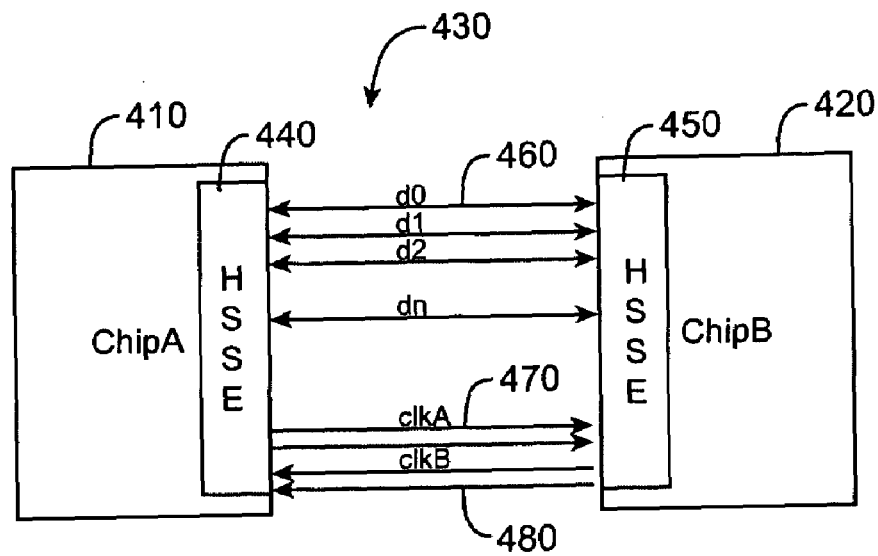
FIG. 4 is a more detailed diagram showing the data and clock pins shared between two high-speed single-ended interfaces that are consistent with an embodiment of the present invention.

FIG. 4 is a more detailed diagram showing the data and clock pins shared between two high-speed single-ended interfaces that are consistent with an embodiment of the present invention. Included are a first integrated circuit 410 and a second integrated circuit 426. The first integrated circuit 410 includes a high-speed single-ended interface 440, and the second integrated circuit 420 includes a high-speed single-ended interface 450. The high-speed single-ended interfaces 440 and 450 transfer data over data buses 450. When integrated circuit 410 transmits data to integrated circuit 420, the high-speed single-ended interface 440 provides a differential clock signal on lines 470 to the high-speed single-ended interface 450. When the second integrated circuit 420 transmits data to the first integrated circuit 410, the high-speed single-ended interface 450 provides a differential clock signal on lines 480 to the high-speed single-ended interface 440.

Figure 5:
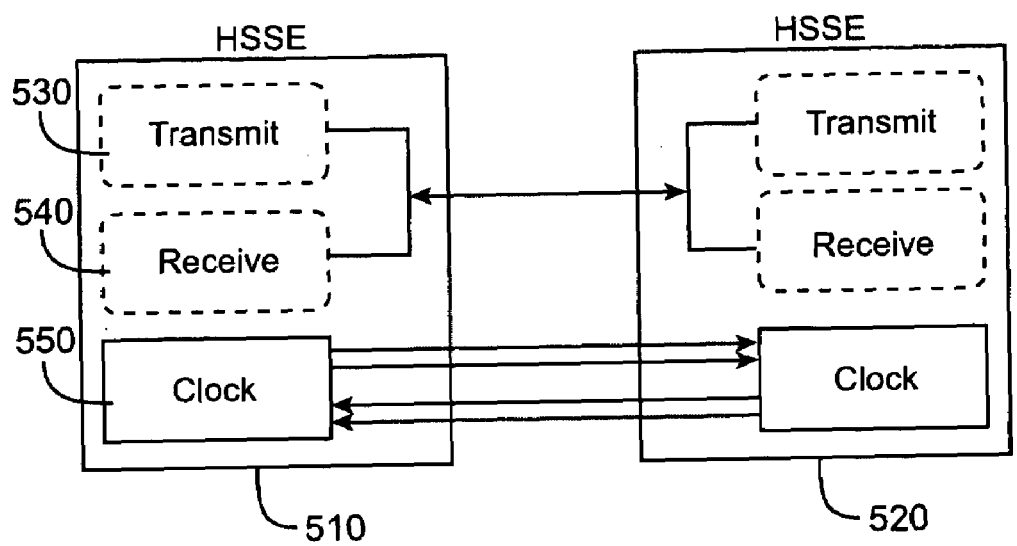
FIG. 5 illustrates the transmit and receive circuits for one data bits in a full duplex mode, as well as the differential nature of the unidirectional clock signals.

FIG. 5 illustrates the transmit and receive circuits for one data channel in a full duplex mode, as well as the bidirectional nature of the clock signals. Included are a first high-speed single-ended interface 510 and a second high-speed single-ended interface 520. Each high-speed single-ended interface includes a transmit 530, receive 540, and clock circuit 550.

Figure 6:
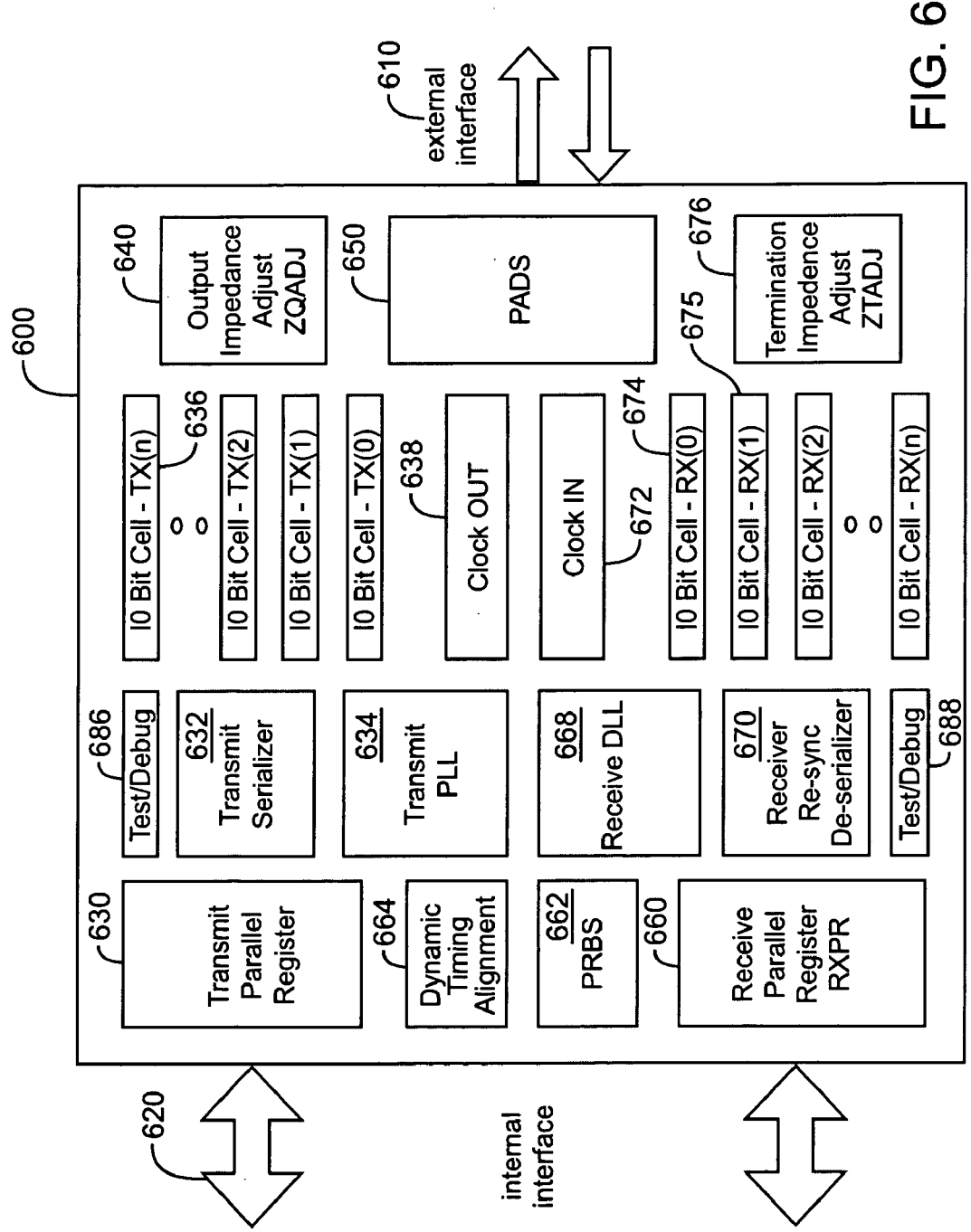
FIG. 6 illustrates the functional blocks and their placement on an integrated circuit consistent with an embodiment of the present invention.

FIG. 6 illustrates the functional blocks and their placement on an integrated circuit consistent with an embodiment of the present invention. This figure includes an integrated circuit interface 600 having connections 620 with the remaining portion of the integrated circuit, as well as an external interface 610.

The integrated circuit 600 receives data for transmission from the internal interface 620 with transmit parallel register 630. The transmit parallel register 630 retimes the data to an interface clock generated by the transmit PLL 634. The transmit parallel register 630 provides data to the transmit serializer 630, which converts the parallel data to a serial format. The transmit serializer provides data to the transmitters 636, which in turn provides signals to the pads 650, which are connected to the external interface 610. In the transmit mode, a clock signal is provided by the clock-out circuit 638. Termination impedances are adjusted by impedance adjustment circuit 640.

The integrated circuit 600 receives data with the receive cells 674 via the pads 650 from the external interface 610. A clock signal is also received by the clock-in circuit 672. The received serial data is de-serialized by the de-serializer circuit 670, which provides data to the parallel registers 670. Input termination impedances are adjusted by termination impendence adjustment circuit 676.

A pseudorandom bit sequence circuit 622 is capable of generating a pseudorandom bit sequence for transmission over the external interface 610. This transmitted data is compared on a second integrated circuit to expected data, and from this comparison a bit-error rate (BER) for the data connection can be determined.

Figure 7:
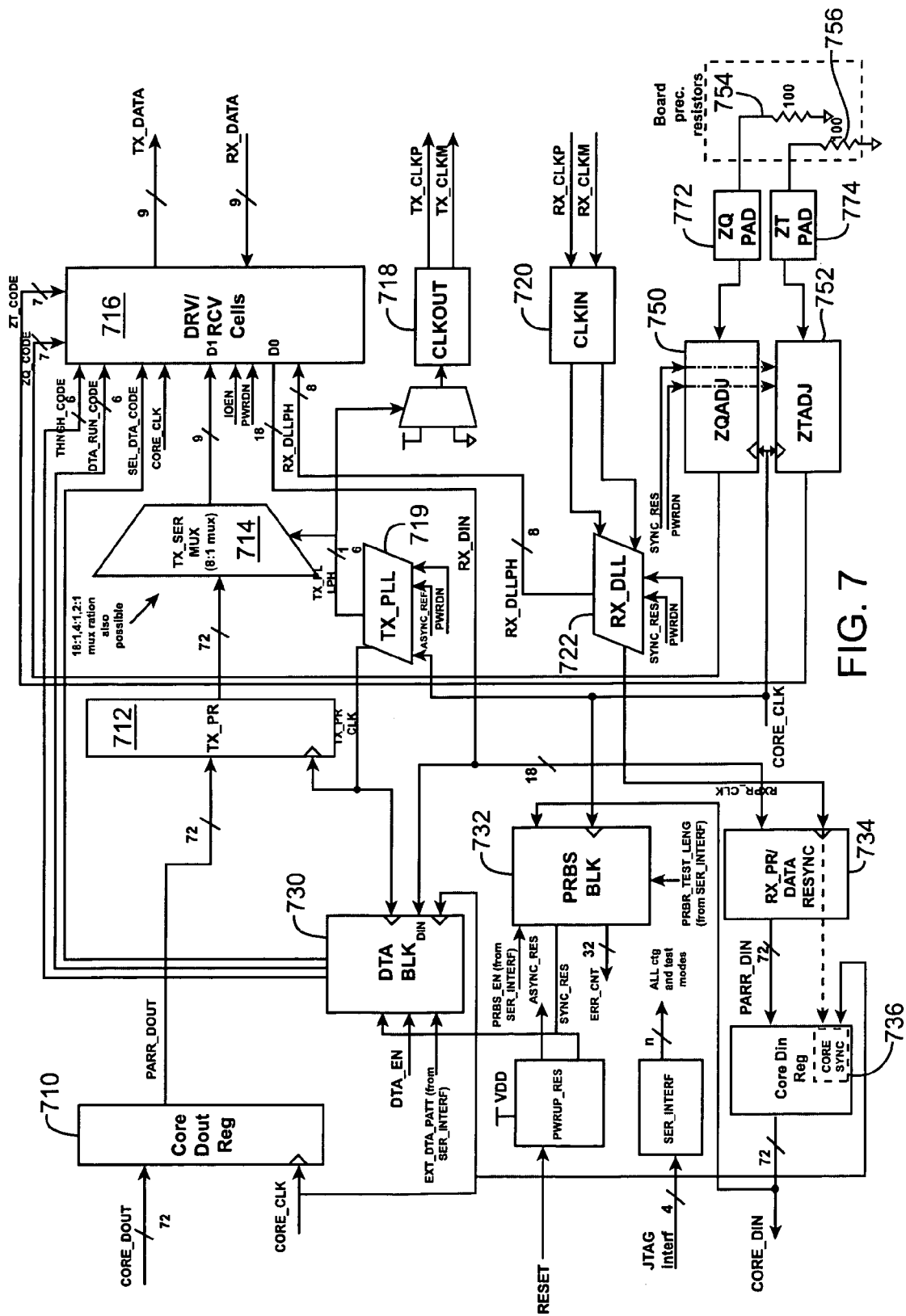
FIG. 7 is a block diagram of an integrated circuit according to an embodiment of the present invention.

FIG. 7 is a block diagram of an integrated circuit according to an embodiment of the present invention. Transmit path data is received from the circuit core by the core data out register 710, which provides parallel data to re-timing circuit 712. The re-timing circuit 712 provides data to the transmit serializer 714. The transmit serializer 714 serializers the data and provides it to the driver cells 716. The driver cells 716 provide data out to a second integrated circuit (not shown), that typically includes this or similar circuitry.

Data is received by the receive cell 716 and provided to the data re-sync circuit 734. The data re-sync circuit converts the serial data to parallel data and provides parallel data to retiming registers 736. The retiming registers 736 provide retimed parallel data to the integrated circuit core. On chip impedance terminations are adjusted by the termination impedance circuits 750 and 752.

Figure 8:
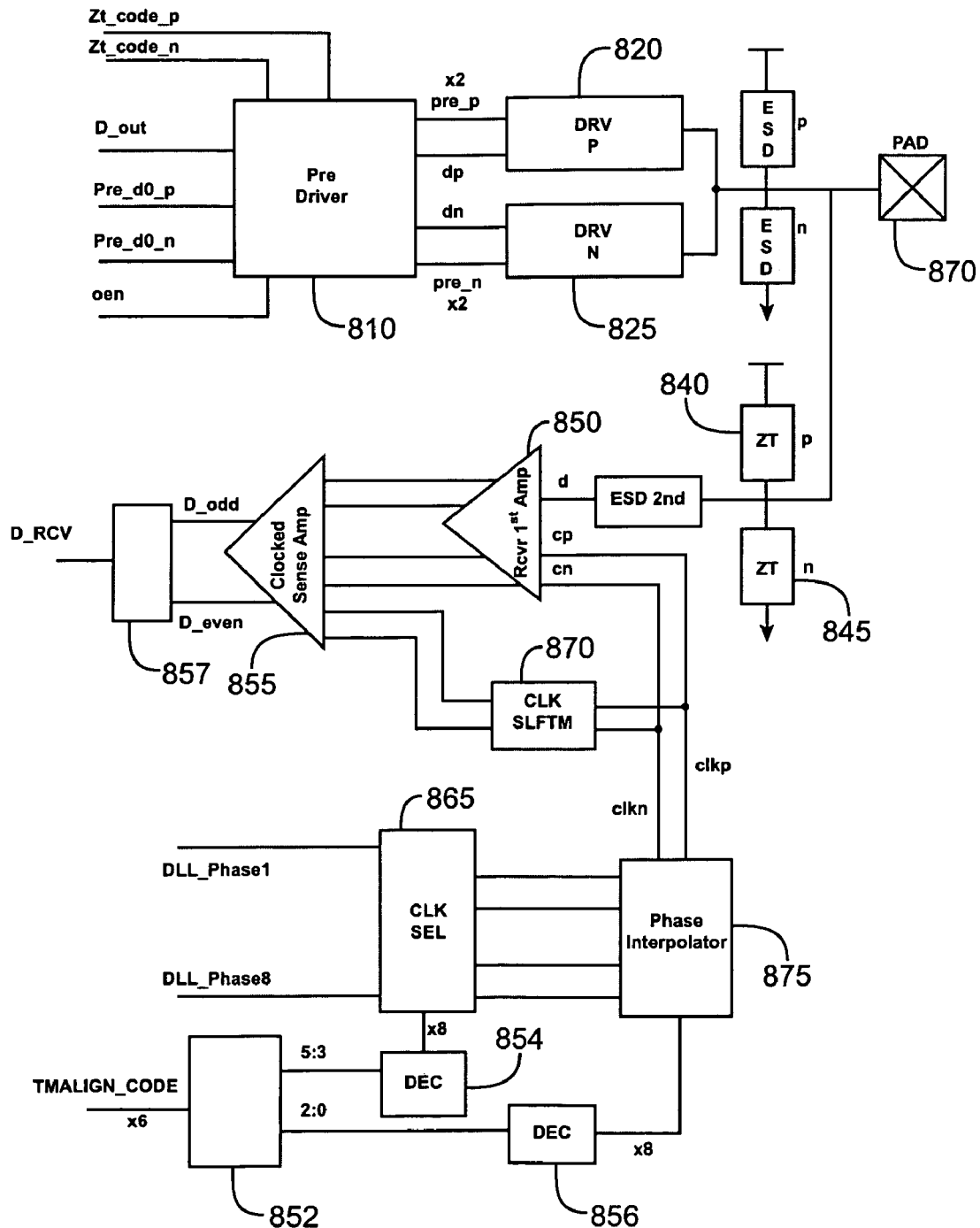
FIG. 8 illustrates a portion of the transmit and receive circuits associated with a single pin in a high-speed single-ended interface consistent with an embodiment of the present invention.

FIG. 8 illustrates a portion of the transmit and receive circuits associated with a single pin in a high-speed single-ended interface consistent with an embodiment of the present invention. The transmit path includes a pre-driver 810, p-driver 820, and n-driver 825. Data to be transmitted is received by the pre-driver circuit 815. The output of pre-driver 810 provides data signals to the p-driver 820 and n-driver 825. The pre-driver 810 can include other circuitry for terminations and tristate functions.

The receive path circuitry includes termination impedance networks 840 and 845, receiver amplifier 850, clocked sense amp 855, and clock alignment circuitry including decoders 854 and 856, coarse clock select circuitry 865, and phase interpolator 875. The clock alignment circuitry aligns the clock to the data received at the pad 870 in such a way that the errors in data reception are minimized. Specifically, a known data pattern or preamble is received at the pads 870. The alignment of the clock provided on pad 870 to the clock sense amp 855 is adjusted, and the optimal timing is found. The alignment configuration that matches the optimal timing is stored and retained. Periodically, the circuit may be recalibrated to minimize the effects of temperature fluctuations and supply variations. Further examples of these circuits can be found in co-pending U.S. patent application Ser. No. 10/997,329, titled "High-Speed Single-Ended Interface," which is incorporated by reference.

Figure 9:
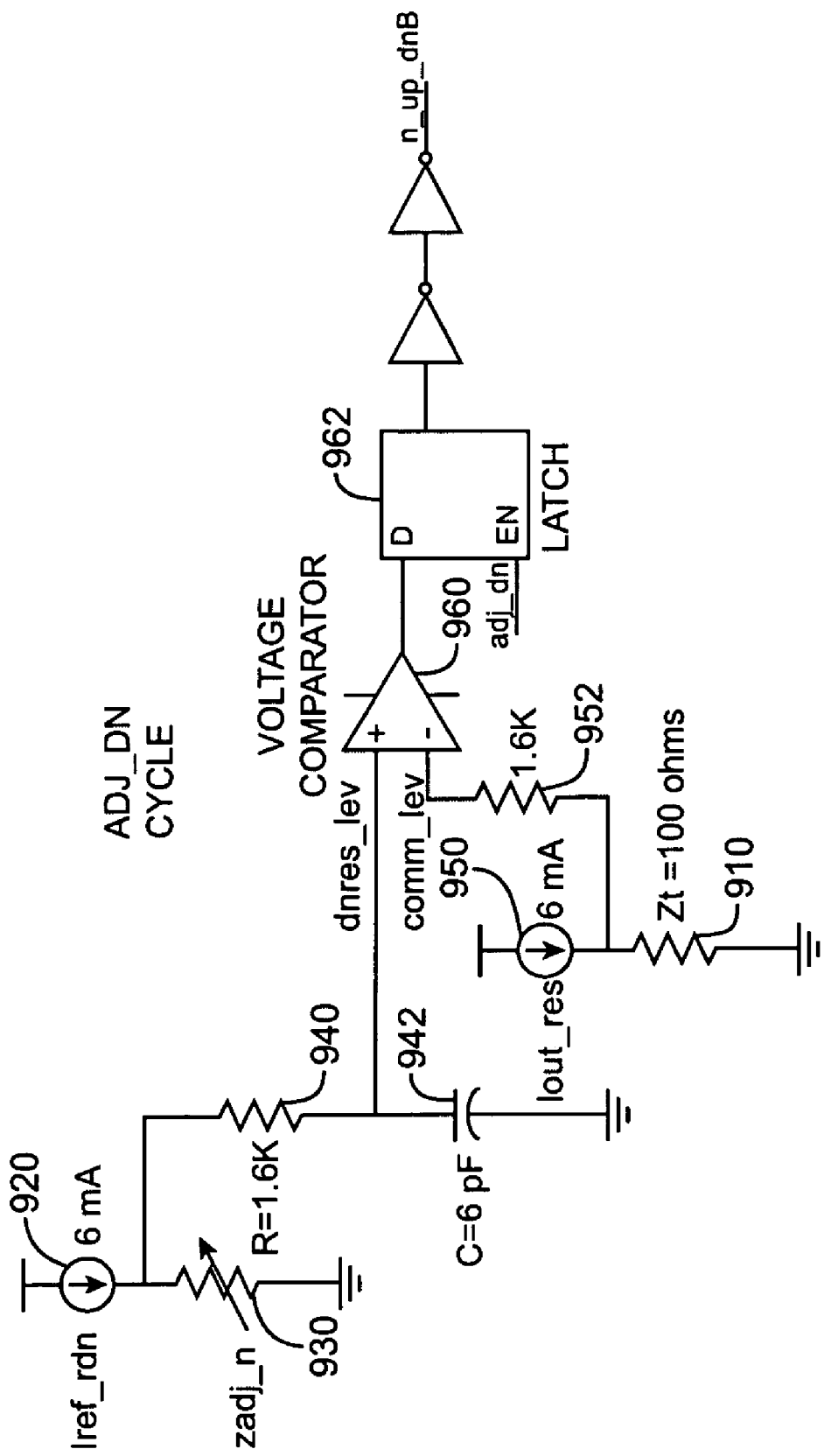
FIG. 9 is a block diagram illustrating the circuitry according to an embodiment of the present invention that is used to adjust a shunt termination resistor that is connected to ground.

FIG. 9 is a block diagram illustrating circuitry according to an embodiment of the present invention that is used to adjust a shunt termination resistor that is connected to ground. This figure includes an external reference resistor 910 and on-chip adjustable resistance 930. This figure further includes current sources 920 and 950, a filter including resistor 940 and capacitor 942, compensating resistor 952, voltage comparator 960, and latch and output buffers 962.

Current source 920 provides a current to the adjustable resistance 930. This generates a voltage, which is filtered by the filter made up of resistor 940 and capacitor 942. The output of the resistor is received by the voltage comparator 960. Current source 950 is similarly used to generate a voltage across the external precision resistor 910. This voltage is compared to the filtered voltage by voltage comparator 960. Resistor 952 is included in series between the external precision resistor 910 and voltage comparator 960 to compensate for any offset voltage that may be caused by filter resistor 940. The output of the comparator is latched by latch 962. The output of the latch is provided to an up-down counter (not shown), the output of which digitally adjusts the value of the variable on-chip resistor 930. The digital code that is used to adjust the on-chip variable resistor 930 is provided as a digital word to similar impedances in the input and output cells of the integrated circuit. In this way, the adjusted value of the on-chip variable resistor 930 is mirrored to other adjustable termination impedances.

The feedback path shown operates as follows. If the on-chip resistor 930 is too large, the corresponding input to the non-inverting input of the voltage comparator is high. As this data is latched, it drives the up-down counter to a lower count such that the variable on-chip impedance 930 is reduced. When the voltage drops across the on-chip variable resistance 930 and the external precision resistor 910 match, the values of the on-chip variable resistor 930 and the external precision resistor 910 are equal.

In this particular embodiment, current sources 920 and 950 are equal, thus the circuit acts to adjust the value of the on-chip impedance 930 to equal to the value of the external precision resistor 910. In other embodiments, there may be a scaling or ratio between these current sources. In this case, the ratio of the values of the external precision resistor 910 and on-chip variable resistance 930 are different than one. For example, the current source 950 may provide half the current as the current source 920. When this is true, for the variable on-chip resister 930 to equal 100 ohms, the external precision resistor 910 should be chosen to be 200 ohms. In this manner power can be reduced.

Figure 10:
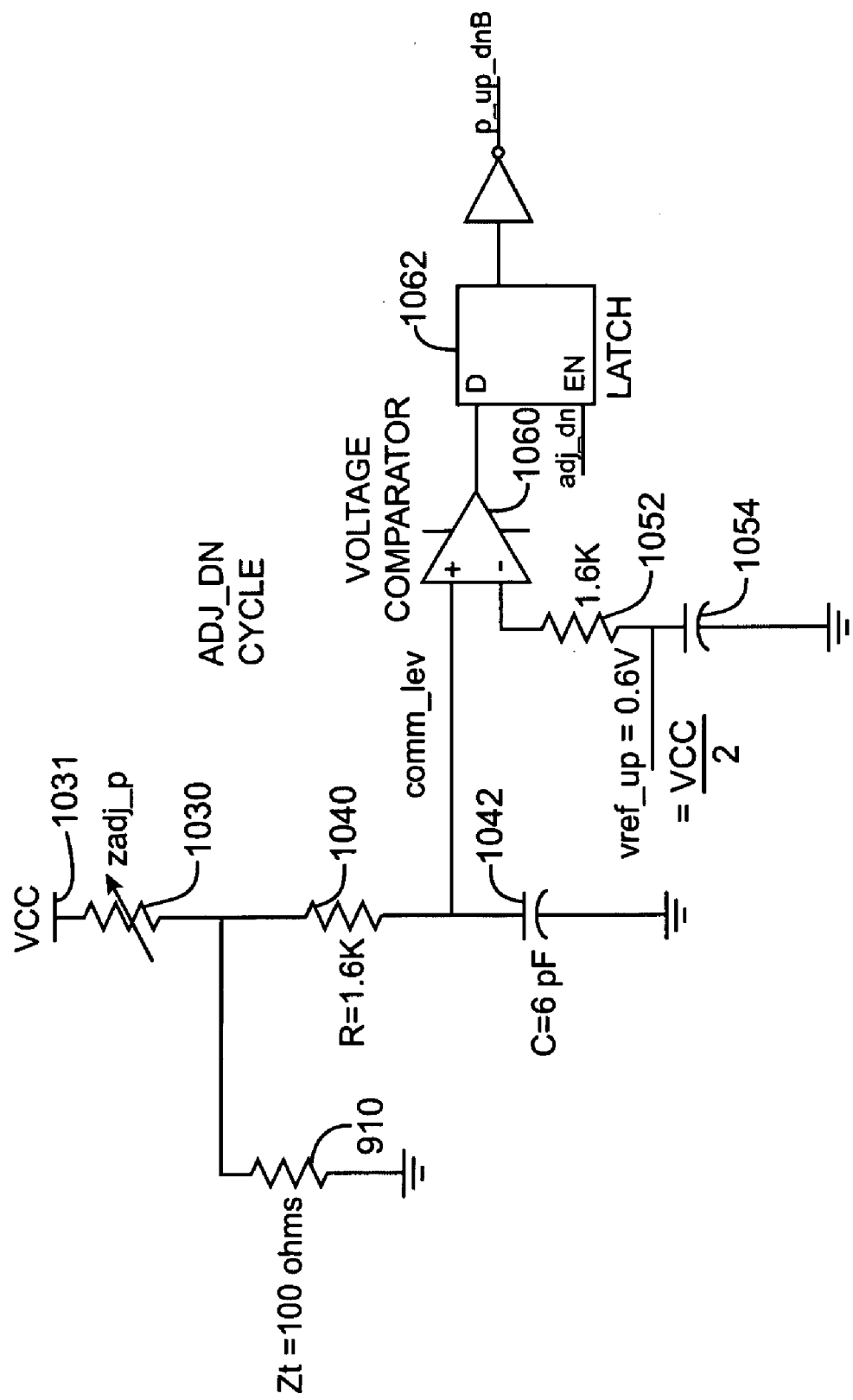
FIG. 10 is a block diagram illustrating the circuitry according to an embodiment of the present invention that is used to adjust a shunt termination resistor that is connected to a supply voltage.

FIG. 10 is a block diagram illustrating the circuitry according to an embodiment of the present invention that is used to adjust a shunt termination resistor that is connected to a supply voltage. This diagram includes the same external precision resistor 910 as was used in FIG. 9, and an on-chip variable resistance 1030. This figure also includes a filter made up of resistor 1040 and capacitance 1042, a reference voltage that is filtered by resistor 1052 and capacitance 1054, voltage comparator 1060, and latch and output inverter 1062.

The voltage supply VCC on line 1031 is divided by the ratio of the external precision resistor 910 and on-chip variable resistance 1030. This voltage is filtered by the filter including resistor 1040 and capacitance 1042. The output of this filter is received by the non-inverting input of the voltage comparator 1060. A reference voltage, in this case a reference voltage that is equal to VCC/2, is received by the filter including resistor 1052 and capacitance 1054. The output of this filter is received by the inverting input of the voltage comparator 1060. The output of the voltage comparator 1060 is latched by the latched 1062.

The feedback path for this circuit operates as follows. If the variable on-chip resistance 1030 is too high, the input to the filter including resistor 1040 and capacitance 1042 is lower than desired. Specifically, it is lower than the reference voltage received by the filter that includes resistor 1052 and capacitance 1054. In this case, the output of the latch is low, and its inverter provides a signal to an up-down counter (not shown) such that the value of the on-chip variable resistance 1030 is reduced.

In this particular example, a reference voltage that is equal to half the supply voltage is provided. In this case, the on-chip variable resistance 1030 is adjusted to match the external precision resistor 910. In other embodiments of the present invention, other reference voltages maybe provided such that the ratio of the on-chip variable resistance 1030 and the external precision resistor 910 is different than one.

Figure 11:
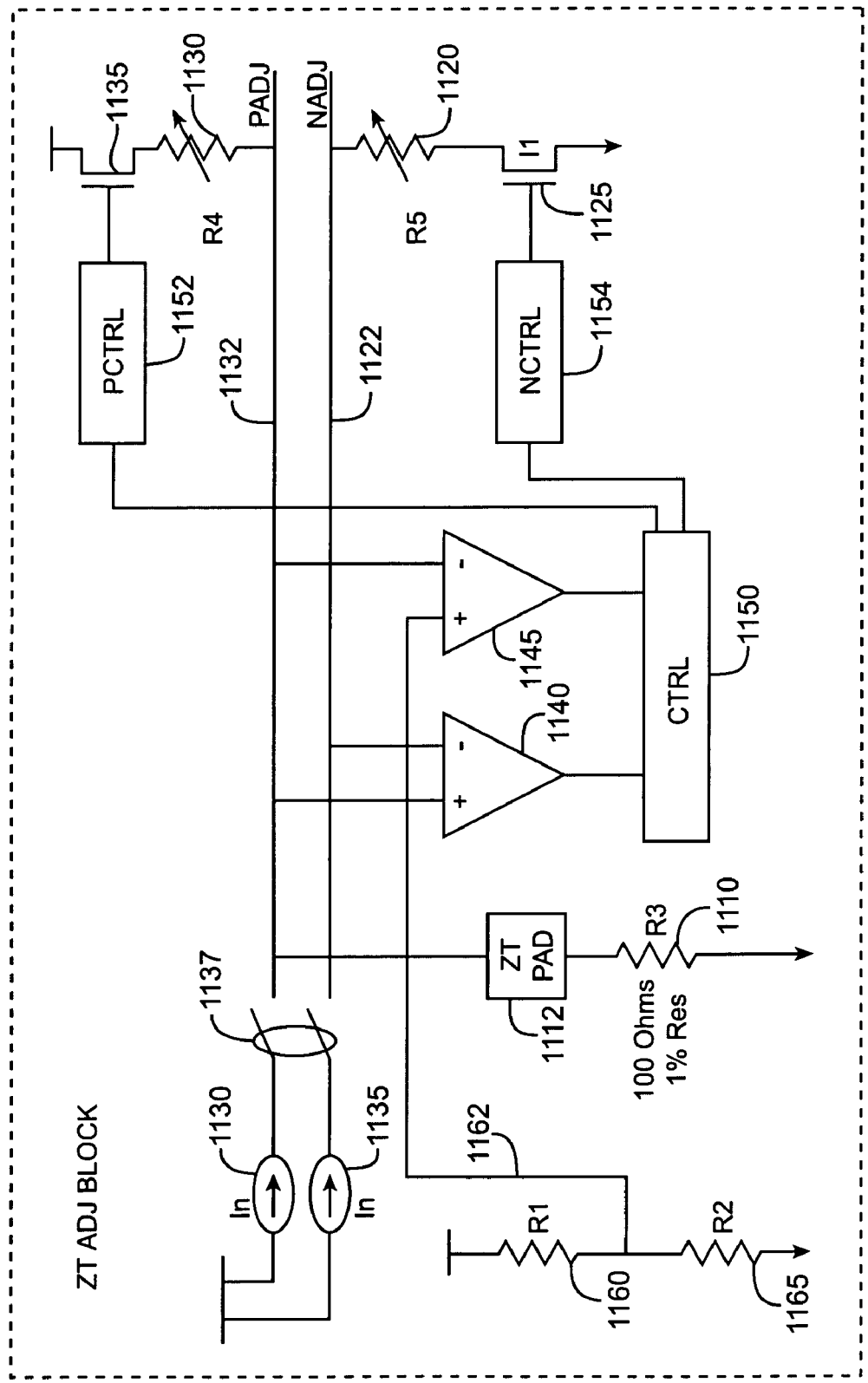
FIG. 11 is a block diagram illustrating the circuitry used to adjust a shunt impedance according to an embodiment of the present invention.

FIG. 11 is a block diagram illustrating the circuitry used to adjust a shunt impedance according to an embodiment of the present invention. This figure includes external precision resistor R3 1110 and variable resistances R5 1120 and R4 1130. This figure also includes comparators 1140 and 1145, and control circuits 1150, 1152, and 1154.

When the adjustable resistor R4 1130 is to be adjusted, the voltage generated by the voltage divider made up of the variable resistor R4 1130 and external precision resistor R3 1110 is compared to the voltage generated by resistor divider made up of R1 1160 and R2 1165. The comparison of these voltages drives control circuits 1150 and 1152, which in turn adjust the value of the variable resistor R4 1130.

When the adjustable resistor R5 1120 is to be adjusted, switches 1137 are closed allowing current from current source 1135 to generate a voltage on line 1122. Similarly, current from current source 1130 flows through external precision resistor R3 1110 generating a voltage on line 1132. These voltages are compared by comparator 1140. The output of comparator 1140 drives the control circuits 1150 and 1154, which in turn adjust the value of the variable resistor R5 1120.

By providing shunt terminations at the receiver end, the common mode voltage at that point is half the supply voltage, which is compliant with the HSTL specification, as well as its improved version, HSTLX.

Figure 12A:
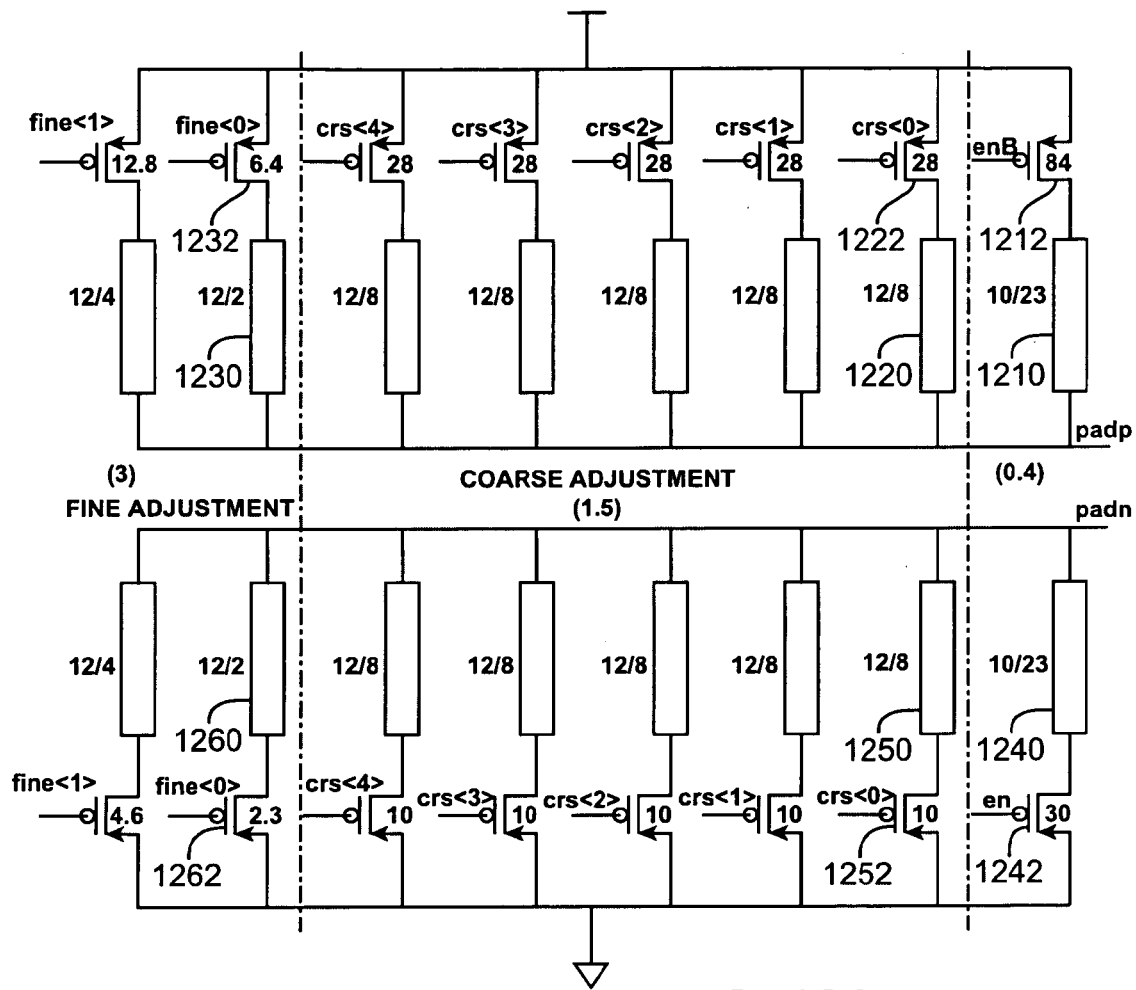
FIG. 12A is a schematic of an adjustable termination resistance that may be used by embodiments of the present invention.

FIG. 12A is a schematic of an adjustable termination resistance that may be used by embodiments of the present invention. In a specific embodiment, this resistor is used to set a receive termination resistor. This adjustable resistor includes a number of parallel resistor is 1210, 1220, and 1230, coupled through p-channel MOS transistors 1212, 1222, and 1232. In one embodiment, these resistors are poly resistors, though other resistances, such as diode connected transistors could be used.

Figure 12B:
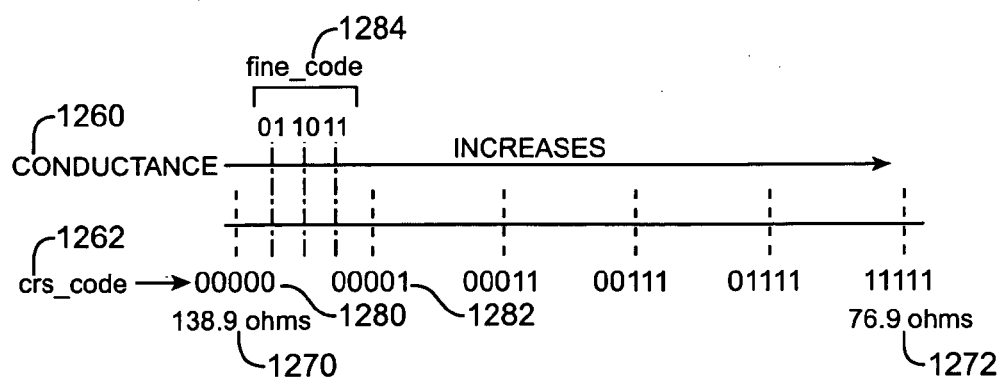
FIG. 12B illustrates the value of this impedance as a function of adjustment code.

A first resistor 1210 is connected as part of the variable resistance by transistor 1212 whenever the circuitry is enabled. This resistance value can be reduced by connecting one or more of the other resistors in parallel. In this is specific embodiment, five further coarse value resistors 1220 can be connected in parallel through transistors 1222, while two fine value resistors 1230 can be connected through transistors 1232. These resistors are scaled to provide the adjustment as depicted in FIG. 12B. Also, the transistor sizes are scaled to match their corresponding resistor ratios. The same principles apply to the shunt variable resistance to ground made up of resistors 1240, 1250, and 1260, and transistors 1242, 1252, and 1262.

FIG. 12B illustrates the value of these impedances as a function of adjustment code. Specifically, if each of the transistors, save for transistor 1212, is opened forming a disconnect, the impedance of the structure is 138.9 ohms 1270 as shown. The conductance can be increased by switching more resistors in parallel with the resistor 1210. For example, if all resistances are switched in parallel with resistor 1210, the value of impedance is 76.9 ohms 1272.

Figure 13:
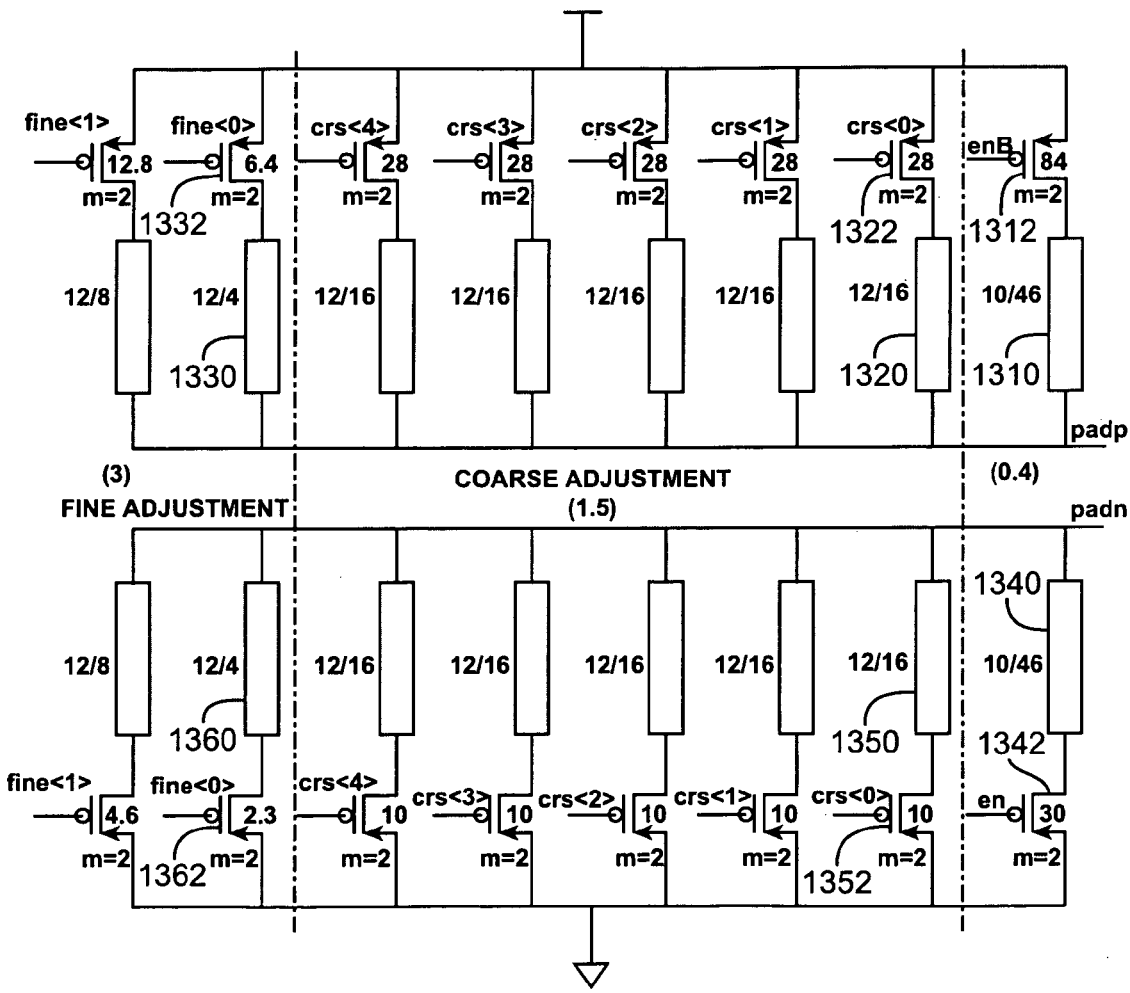
FIG. 13 is a schematic of an adjustable termination resistance that may be used by embodiments of the present invention.

FIG. 13 is a schematic of an adjustable termination resistance that may be used by embodiments of the present invention. In a specific embodiment, this resistor is used to adjust termination resistors at the driver side of a high-speed single-ended interface. If one resistor is used in each driver cell, then only one of these variable resistors is needed. The resistors in these cells are twice the width as those in FIG. 12A, thus providing a range of resistor values centered at approximately 50 ohms.

The resistors in FIGS. 12A and 13 may be the adjustable resistors shown in FIGS. 9 and 10. Once adjusted, the digital control signals that control the gates of the series transistors are distributed to matching resistors in the driver and receive cells. Typically, the receive termination includes 100 ohm resistors from the pad to ground and the supply, for 50 ohms total. The driver termination typically includes a 50 ohm resistor between the output driver and the pad.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of adjusting a variable termination resistor on an integrated circuit, the method comprising:
   providing a first current through a variable reference resistor having a first resistance value to generate a first voltage;
   providing a second current through a second resistor to generate a second voltage;
   comparing the first voltage and the second voltage to generate a first output; and
   using the first output to vary the first resistance value, wherein the first resistance value is varied by:
      providing a first plurality of logic signals to a first plurality of transistors, each in series with one of a first plurality of resistors, where each of the first plurality of resistors are equally weighted; and
      providing a second plurality of logic signals to a second plurality of transistors, each in series with one of a second plurality of resistors, where each of the second plurality of resistors are binarily weighted.

2. The method of claim 1 wherein the second resistor is not located on the integrated circuit.

3. The method of claim 2 wherein the variable reference resistor is on the integrated circuit.

4. The method of claim 3 wherein the comparison of the first voltage and the second voltage is used to generate a digital word, and wherein the digital word is used to adjust the variable reference resistor.

5. The method of claim 4 wherein the digital word is used to adjust the variable termination resistor.

6. The method of claim 5 wherein the variable termination resistor is a series resistor at a transmitter output.

7. The method of claim 5 wherein the variable termination resistor is a shunt resistor at a receiver input.

8. The method of claim 5 wherein the variable termination resistor includes two shunt resistors at a receiver input, and wherein one shunt resistor is coupled to ground and the other is coupled to a supply voltage.

9. A method of adjusting variable termination resistors on an integrated circuit, the method comprising:
   adjusting a first variable termination resistor by:
      dividing a supply voltage using a first resistor series combination including a first variable reference resistor having a first resistance value and a fixed reference resistor to generate a first voltage;
      dividing the supply voltage using a second resistor series combination to generate a second voltage;
      comparing the first voltage and the second voltage to generate a first output; and
      using the first output to vary the first resistance value; and
   adjusting a second variable termination resistor by:
      providing a first current through a second variable reference resistor having a second resistance value to generate a third voltage;
      providing a second current to a node common between the first variable resistor and the fixed reference resistor to generate a fourth voltage;
      comparing the third voltage and the fourth voltage to generate a second output; and
      using the second output to vary the second resistance value.

10. The method of claim 9 wherein the fixed reference resistor is not located on the integrated circuit.

11. The method of claim 10 wherein the first and second variable reference resistors are on the integrated circuit.

12. The method of claim 11 wherein the comparison of the first voltage and the second voltage is used to generate a digital word, and wherein the digital word is used to adjust the first variable reference resistor.

13. The method of claim 12 wherein the digital word is used to adjust the first variable termination resistor.

14. The method of claim 13 wherein the first variable termination resistor is a series resistor at a transmitter output.

15. The method of claim 13 wherein the first variable termination resistor is a shunt resistor at a receiver input.

16. The method of claim 13 wherein the variable termination resistors include two shunt resistors at a receiver input, and wherein one shunt resistor is coupled to ground and the other is coupled to a supply voltage.

17. The method of claim 13 wherein the first variable termination resistor includes a plurality of resistors, each resistor coupled to a transistor.

18. The method of claim 17 wherein the resistors are poly resistors, and the transistors are p-channel MOS transistors.

19. An integrated circuit comprising:
   a pad to couple to an external resistor;
   a first variable reference resistor coupled to the pad and having a first resistance value;
   a second variable reference resistor having a second resistance value;
   a first current source coupled to the pad;
   a second current source coupled to the second variable reference resistor;
   a series of resistors;
   a first comparator having a first input coupled to a common node of the series of resistors and a second input coupled to the pad; and
   a second comparator having a first input coupled to the pad and a second input coupled to the second variable reference resistor.

20. The integrated circuit of claim 19 further comprising:
   a first control circuit having an input coupled to an output of the first comparator and an output coupled to the first variable reference resistor; and
   a second control circuit having an input coupled to an output of the second comparator and an output coupled to the second variable reference resistor.

21. The integrated circuit of claim 20 further comprising:
   a first variable termination resistor coupled to the output of the first control circuit; and
   a second variable termination resistor coupled to the output of the second control circuit.

22. The integrated circuit of claim 19 wherein the first variable reference resistor comprises:
   a first plurality of transistors, each in series with one of a first plurality of resistors, where each of the first plurality of resistors are equally weighted; and
   a second plurality of transistors, each in series with one of a second plurality of resistors, where each of the second plurality of resistors are binarily weighted.

* * * * *